(12) United States Patent
Liu et al.

(10) Patent No.: US 11,700,862 B2
(45) Date of Patent: Jul. 18, 2023

(54) ENERGY-SAVING QUICK-FREEZING METHOD FOR GOLDEN POMFRET

(71) Applicants: Guangdong Ocean University, Guangdong (CN); SOUTHERN MARINE SCIENCE AND ENGINEERING GUANGDONG LABORATORY (ZHANJIANG), Guangdong (CN)

(72) Inventors: Shucheng Liu, Guangdong (CN); Zuomiao Yang, Guangdong (CN); Qinxiu Sun, Guangdong (CN); Jieqian Zhou, Guangdong (CN); Shuai Wei, Guangdong (CN); Qiuyu Xia, Guangdong (CN); Jialong Gao, Guangdong (CN); Ouyang Zheng, Guangdong (CN)

(73) Assignees: Guangdong Ocean University, Guangdong (CN); SOUTHERN MARINE SCIENCE AND ENGINEERING GUANGDONG LABORATORY (ZHANJIANG), Guangdong (CN)

(*) Notice: Subject to any disclaimer, the term of this patent is extended or adjusted under 35 U.S.C. 154(b) by 0 days.

(21) Appl. No.: 17/638,197

(22) PCT Filed: Dec. 28, 2021

(86) PCT No.: PCT/CN2021/142044
§ 371 (c)(1),
(2) Date: Feb. 25, 2022

(87) PCT Pub. No.: WO2023/010786
PCT Pub. Date: Feb. 9, 2023

(65) Prior Publication Data
US 2023/0029705 A1 Feb. 2, 2023

(30) Foreign Application Priority Data
Jul. 31, 2021 (CN) .......................... 202110876303.X

(51) Int. Cl.
*A23B 4/09* (2006.01)
*A23L 3/375* (2006.01)

(52) U.S. Cl.
CPC ................ *A23B 4/09* (2013.01); *A23L 3/375* (2013.01); *A23V 2002/00* (2013.01)

(58) Field of Classification Search
CPC ...................... A23B 4/06–09; A23L 3/36–375
See application file for complete search history.

(56) References Cited

U.S. PATENT DOCUMENTS 3,404,989 A * 10/1968 Hirtensteiner .......... A23L 3/375
426/310
4,171,625 A * 10/1979 Morgan .................. A23L 3/375
62/52.1

(Continued)

FOREIGN PATENT DOCUMENTS

CN   103070221   5/2013
CN   108362058   8/2018

(Continued)

OTHER PUBLICATIONS

Translation of CN 109662239A (Year: 2019).*

(Continued)

*Primary Examiner* — Drew E Becker
(74) *Attorney, Agent, or Firm* — JCIPRNET

(57) ABSTRACT

The present invention provides an energy-saving quick-freezing method for golden pomfret. The method is putting golden pomfret into a liquid nitrogen quick-freezer with a cavity temperature of A, and when a core temperature of fish body reaches −6 to −4° C., turning off the liquid nitrogen quick-freezer; when the cavity temperature of the liquid (Continued)

nitrogen quick-freezer rises to B, starting the liquid nitrogen quick-freezer, and when the core temperature of the fish body reaches −19 to −17° C., turning off the liquid nitrogen quick-freezer; and taking out the golden pomfret and storing at −19 to −17° C.; wherein, the A is −105 to −85° C., the B is −95 to −65° C., and A<B.

8 Claims, 4 Drawing Sheets

(56) References Cited

U.S. PATENT DOCUMENTS

| | | | | |
|---|---|---|---|---|
| 4,396,636 | A * | 8/1983 | Mitsuda | A23B 4/066 426/418 |
| 4,852,358 | A * | 8/1989 | Acharya | A23L 3/375 62/380 |
| 5,256,434 | A * | 10/1993 | Conway | A23B 4/062 426/396 |
| 5,715,688 | A * | 2/1998 | Jones, III | A23L 3/363 62/63 |
| 6,167,708 | B1 * | 1/2001 | Cloarec | A23L 3/362 62/63 |
| 2004/0053204 | A1 * | 3/2004 | Morris | F25D 3/11 435/1.1 |
| 2005/0136161 | A1 * | 6/2005 | Okita | F25D 3/122 426/393 |
| 2010/0083687 | A1 * | 4/2010 | Handa | A23L 3/362 700/282 |
| 2016/0073648 | A1 * | 3/2016 | Hall | A23B 4/09 426/657 |
| 2017/0138661 | A1 * | 5/2017 | Newman | A23L 3/001 |

FOREIGN PATENT DOCUMENTS

| | | |
|---|---|---|
| CN | 108709352 | 10/2018 |
| CN | 109662239 | 4/2019 |
| CN | 111773878 | 10/2020 |
| JP | H06300410 | 10/1994 |

OTHER PUBLICATIONS

Translation of CN 106983095A (Year: 2017).*
Lu Dingwei et al., "An Experiment By Using Liquid Nitrogen To Deepfreeze Whitebait and Its Optimized Approving Method," Cryogenics, Aug. 1999, pp. 228-230.
Lei Mengmeng et al., "Study On the Effect of Liquid Nitrogen Interval Freezing Process On Fish Balls Quality," Food Science, vol. 45, May 2020, pp. 112-117.
Gong Taoshuo et al., "Effects of Different Freezing Methods on Water State, Tissue Structure and Quality Changes of Trachinotus ovatus," Food Science, vol. 40, 2019, pp. 213-219.
Jieqian Zhou et al., "Effects of magnetic field-assisted immersion freezing at different magnetic field intensities on the muscle quality of golden pompano (*Trachinotus ovatus*)", Food Chemistry, vol. 407, Nov. 2022, pp. 1-12.

* cited by examiner

ENERGY-SAVING QUICK-FREEZING METHOD FOR GOLDEN POMFRET

This is a 371 application of the International PCT application Ser. no. PCT/CN2021/142044, filed on Dec. 28, 2021, which claims the priority benefits of China Application No. 202110876303.X, filed on Jul. 31, 2021. The entirety of each of the above-mentioned patent applications is hereby incorporated by reference herein and made a part of this specification.

TECHNICAL FIELD

The invention belongs to the technical field of storage for golden pomfret, and more specifically, relates to an energy-saving quick-freezing method for golden pomfret.

DESCRIPTION OF RELATED ART

Golden pomfret, scientific name as *Trachinotus ovatus*, belongs to class of Osteichthyes, order of Perciformes, family of Carangidae and genus of *Trachinotus*, and is one of the important marine economic fish in the southern coast of China. Golden pomfret has tender flesh, delicious taste, high nutritional value and no intermuscular small thorns, and is very popular among consumers. With a growing scale and production of golden pomfret, supply exceeds demand, and it is of vital importance to use appropriate quick-freezing methods to extend a shelf life. However, at present, golden pomfret sold in the market is mainly in fresh and chilled form, which leads to a lot of spoilage and deterioration of golden pomfret. Especially in a peak period of golden pomfret production, if a processing is not timely, it will cause a lot of resource wastes.

At present, GONG Taoshuo et al have disclosed four methods for freezing golden pomfret, including plate freezing, spiral freezing, ultra-low temperature freezing and freezer freezing (GONG Taoshuo, LAN Weiqing, WANG Meng, XIE Jing. Effects of Different Freezing Methods on Water State, Tissue Structure and Quality Changes of *Trachinotus ovatus*[J]. Food Science, 2019, 40(23): 213-219.), but cooking loss of these methods on golden pomfret is all above 16%, existing a certain degree of resource wastes. Therefore, it is quite necessary for the storage for golden pomfret to find a method that can effectively maintain a quality of golden pomfret and reduce cooking loss.

SUMMARY

Aiming at defects and deficiencies of the above-mentioned existing golden pomfret freezing methods, the present invention aims to provide an energy-saving quick-freezing method for golden pomfret, so as to reduce cooking loss of golden pomfret muscles, thereby ensuring a quality of golden pomfret.

The above-mentioned objective of the present invention is achieved through the following technical solutions.

The present invention provides a quick-freezing method for golden pomfret, including the following steps:

S1. putting golden pomfret into a liquid nitrogen quick-freezer with a cavity temperature of A, and when a core temperature of fish body reaches −6 to −4° C., turning off the liquid nitrogen quick-freezer;

S2. when the cavity temperature of the liquid nitrogen quick-freezer rises to B, starting the liquid nitrogen quick-freezer, and when the core temperature of the fish body reaches −19 to −17° C., turning off the liquid nitrogen quick-freezer; and S3. taking out the golden pomfret and storing at −19 to −17° C.;

wherein, the A is −105 to −85° C., the B is −95 to −65° C., and A<B.

The present invention starts from two aspects of energy saving and quality of golden pomfret, conducts targeted research on quick-freezing method for golden pomfret, and creatively transforms the quick-freezing method of single-stage liquid nitrogen quick-freezing into two-stage liquid nitrogen quick-freezing. Through a specific control of parameters such as freezing temperature and full use of liquid nitrogen, not only a liquid nitrogen consumption is reduced and energy saving is achieved, but also it is conducive to a rapid production of a large number of uniform small ice crystals in body of golden pomfret, reducing damage to fish tissue, reducing hardness loss and cooking loss during the freezing process of golden pomfret, effectively ensuring a quality of golden pomfret and prolonging a shelf life of golden pomfret.

Liquid nitrogen quick-freezing has advantages of large heat transfer coefficient, fast freezing speed, low dry consumption, low energy consumption, and good quality. Through a process of low-temperature liquid nitrogen vaporization and subsequent cooling, it absorbs a large amount of sensible heat and latent heat, resulting in partial vitrification and freezing of golden pomfret muscles, reducing damage of ice crystals to muscle cells.

Step S1 is the first stage (phase transition stage) of golden pomfret temperature. When the liquid nitrogen quick-freezer is turned off, a remaining cooling capacity of the quick-freezing will be fully utilized to assist in completing freezing of golden pomfret in the second stage (cryogenic process). That is, during a period when the cavity temperature rises from A to B, the remaining cooling capacity in the phase transition stage will continue to freeze golden pomfret, thereby reducing a liquid nitrogen consumption and achieving energy saving.

Most preferably, the A is −95° C.

Further preferably, the B is −75 to −65° C.

Most preferably, the core temperature of the fish body in step S1 is −5° C.

Most preferably, the core temperature of the fish body in step S2 is −18° C.

Most preferably, a storage temperature in step S3 is −18° C.

Preferably, the liquid nitrogen quick-freezer includes a spray liquid nitrogen quick-freezer, a cold air circulation liquid nitrogen quick-freezer, and an immersion liquid nitrogen quick-freezer.

Further preferably, the liquid nitrogen quick-freezer is a spray liquid nitrogen quick-freezer.

Liquid nitrogen quick-freezing can generally be divided into three types: cold air circulation freezing, immersion freezing, and spray freezing, wherein, spray freezing is to spray liquid nitrogen through a nozzle into a mist, and directly contact a freezing object to achieve the freezing. After liquid nitrogen is gasified, it can pre-cool food, improving a freezing efficiency. Therefore, spray freezing enjoys a reputation of "magic freezing" and has wide applications.

More preferably, the spray liquid nitrogen quick-freezer includes a large cabinet spray liquid nitrogen quick-freezer, a large tunnel liquid nitrogen quick-freezer, and a small cabinet spray liquid nitrogen quick-freezer.

Preferably, the core temperature of the fish body is a temperature at a geometric center of the fish body.

As a preferred implementation, steps of the quick-freezing method for golden pomfret are as follows:

S1. putting golden pomfret into a spray liquid nitrogen quick-freezer with a cavity temperature of −95° C., and when a core temperature of fish body reaches −5° C., turning off the spray liquid nitrogen quick-freezer;

S2. when the cavity temperature of the spray liquid nitrogen quick-freezer rises to −75 to −65° C., starting the spray liquid nitrogen quick-freezer, and when the core temperature of the fish body reaches −18° C., turning off the spray liquid nitrogen quick-freezer; and S3. taking out the golden pomfret and storing at −18° C.

The present invention has the following beneficial effects.

The present invention starts from two aspects of energy saving and quality of golden pomfret, conducts targeted research on quick-freezing method for golden pomfret, and creatively transforms the quick-freezing method of single-stage liquid nitrogen quick-freezing into two-stage liquid nitrogen quick-freezing. Through a specific control of parameters such as freezing temperature and full use of liquid nitrogen, not only a liquid nitrogen consumption is reduced and energy saving is achieved, but also hardness loss and cooking loss during the freezing process of golden pomfret muscles are reduced, effectively ensuring a quality of golden pomfret and prolonging a shelf life of golden pomfret.

Among them, Fresh represents a Fresh group, that is, the group that conducts an experiment without any freezing treatment just after 24 hours of balancing temperature in a refrigerator at 4° C.; RF represents air freezing; LNF represents liquid nitrogen quick-freezing;

−35° C. RF represents an air freezing group at −35° C.;

−35° C. LNF group represents a single-stage liquid nitrogen quick-freezing group frozen at −35° C.; −55° C. LNF group represents a single-stage liquid nitrogen quick-freeze group frozen at −55° C.; −75° C. LNF group represents a single-stage liquid nitrogen quick-freezing group frozen at −75° C.; −85° C. LNF group represents a single-stage liquid nitrogen quick-freezing group frozen at −85° C.; −95° C. LNF group represents a single-stage liquid nitrogen quick-freezing group frozen at −95° C.; −105° C. LNF group represents a single-stage liquid nitrogen quick-freezing group frozen at −105° C.; −115° C. LNF group represents a single-stage liquid nitrogen quick-freezing group frozen at −115° C.;

−95° C./−35° C. LNF group represents a two-stage liquid nitrogen quick-freezing group with a first stage temperature of −95° C. and a second stage temperature of −35° C.; −95° C./−55° C. LNF group represents a two-stage liquid nitrogen quick-freezing group with a first stage temperature of −95° C. and a second stage temperature of −55° C.; −95° C./−65° C. LNF group represents a two-stage liquid nitrogen quick-freezing group with a first stage temperature of −95° C. and a second stage temperature of −65° C.; −95° C./−75° C. LNF group represents a two-stage liquid nitrogen quick-freezing group with a first stage temperature of −95° C. and a second stage temperature of −75° C.; −95° C./−85° C. LNF group represents a two-stage liquid nitrogen quick-freezing group with a first stage temperature of −95° C. and a second stage temperature of −85° C.

DESCRIPTION OF THE EMBODIMENTS

The present invention is further described below with reference to accompanying drawings and specific embodiments, but the embodiments do not limit the present invention in any form. Unless otherwise specified, reagents, methods and equipment used in the present invention are conventional reagents, methods and equipment in the technical field.

Unless otherwise specified, the reagents and materials used in the following embodiments are commercially available.

(1) Experimental Materials

Fresh golden pomfret (500±50 ) was purchased from Dongfeng aquatic product wholesale market in Zhanjiang, sent to a laboratory within one hour, killed at ice temperature, washed with clean water and wiped dry, weighed, bagged and balanced temperature for 24 h in a refrigerator at 4° C. for use.

(2) Experimental Equipment

DJL-QF60 cabinet liquid nitrogen quick-freezer was purchased from Shenzhen Dejieli Freezing Technology Co., Ltd.; TA.XT plusC texture analyzer was purchased from Stable Micro System Co., UK.

Figure 1:
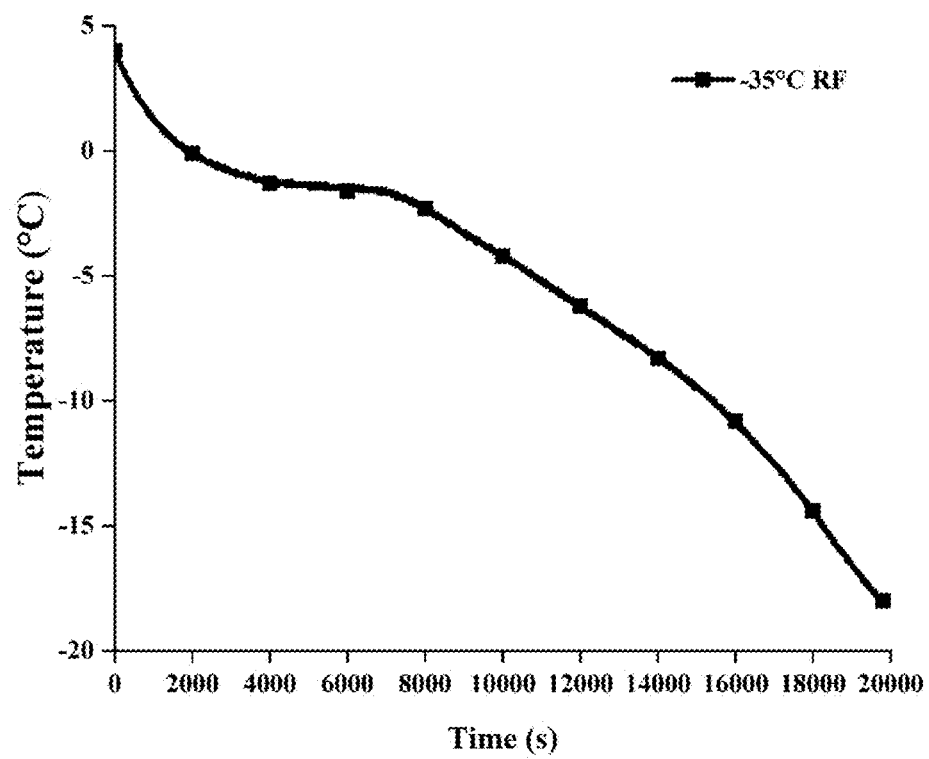
FIG. 1 is a freezing curve of an air freezing group.

Embodiment 1: Single-Stage Liquid Nitrogen Quick-freezing Treatment of Golden Pomfret (1) Air Freezing Treatment S1. golden pomfret was put into a refrigerator at −35° C. for freezing, a probe of a paperless recorder was inserted into a geometric center of fish body, and a U-disk was inserted at the same time, time and temperature changes in real time were recorded, and data changes were recorded every two seconds; after a core temperature of fish body reached −18° C., freezing was finished, the U-disk was pulled out, and data were imported into origin software to draw a freezing curve of air freezing at −35° C., as shown in FIG. 1.

S2. the frozen golden pomfret was quickly transferred to −18° C. for 24 h storage, then put in a refrigerator at 4° C. for thawing, until the core temperature of the fish body reached 4° C., muscles on both sides of its back (length*width*thickness of 8 cm*3 cm*1 cm) were taken for subsequent determination of indicators.

(2) Single-stage Liquid Nitrogen Quick-freezing Treatment

Figure 2:
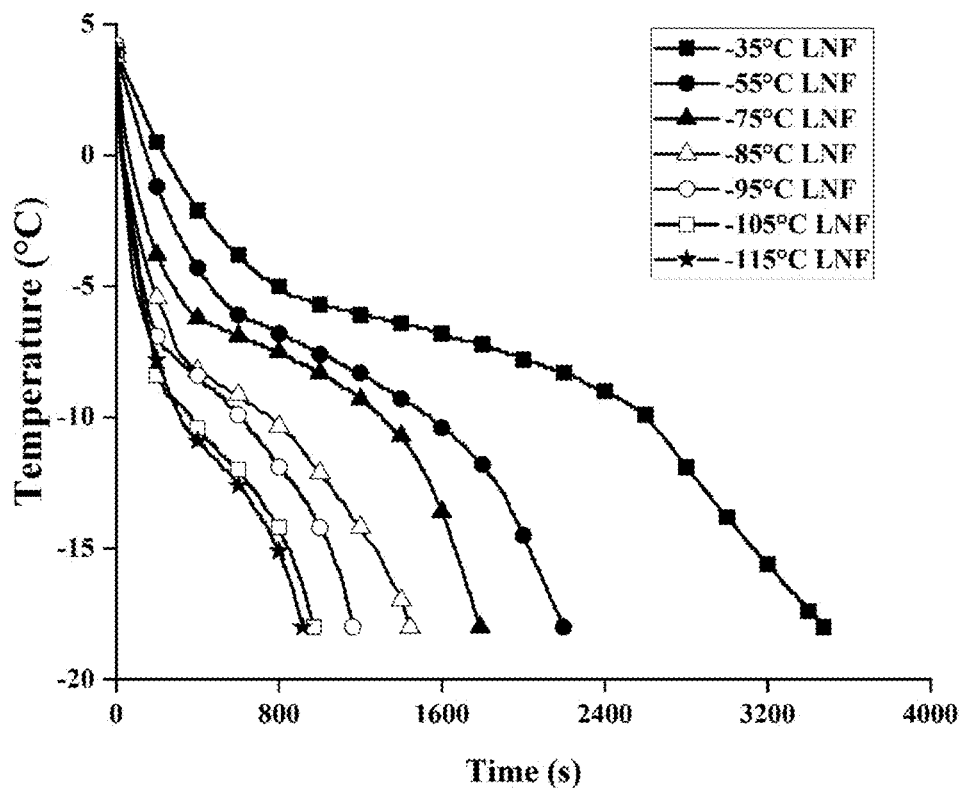
FIG. 2 is a freezing curve of single-stage liquid nitrogen quick-freezing groups.

S1. golden pomfret was put on a tray in a cavity of a liquid nitrogen quick-freezer with a cavity temperature of −35° C., −55° C., −75° C., −85° C., −95° C., −105° C., and −115° C. respectively, a probe of a paperless recorder was inserted into a geometric center of fish body, and a U-disk was inserted at the same time, time and temperature changes in real time were recorded, and data changes were recorded every two seconds; after a core temperature of fish body reached −18° C., freezing was finished, the U-disk was pulled out, and data were imported into origin software to draw a freezing curve of single-stage liquid nitrogen quick-freezing, as shown in FIG. 2.

S2. the frozen golden pomfret was quickly transferred to −18° C. for 24 h storage, then put in a refrigerator at 4° C. for thawing, until the core temperature of the fish body reached 4° C., muscles on both sides of its back (length*width*thickness of 8cm*3 cm*1 cm) were taken for subsequent determination of indicators.

Combining FIG. 1 and FIG. 2, it can be seen that time of the single-stage liquid nitrogen quick-freezing treatment groups is significantly shorter than that of the air freezing treatment group, indicating that a freezing speed of liquid nitrogen quick-freezing is significantly faster than that of air freezing.

Embodiment 2: Determination of Cooking Loss and Hardness of Single-Stage Liquid Nitrogen Quick-freezing Treatment Groups (1) Determination of Cooking Loss A thawed sample in the two groups of Embodiment 1 (one of the two back muscles with a length*width*thickness of 8 cm*3 cm*1 cm) was weighed ($W_1$) and heated in a water bath at 85° C. until a core temperature of the sample reached 75° C., filter paper was used to absorb moisture on a surface of the sample, mass of the sample was accurately weighed, recorded as $W_2$, and cooking loss was calculated according to a formula [cooking loss (%)=$(W_1-W_2)/W_1*100\%$], obtaining FIG. 3.

Figure 3:
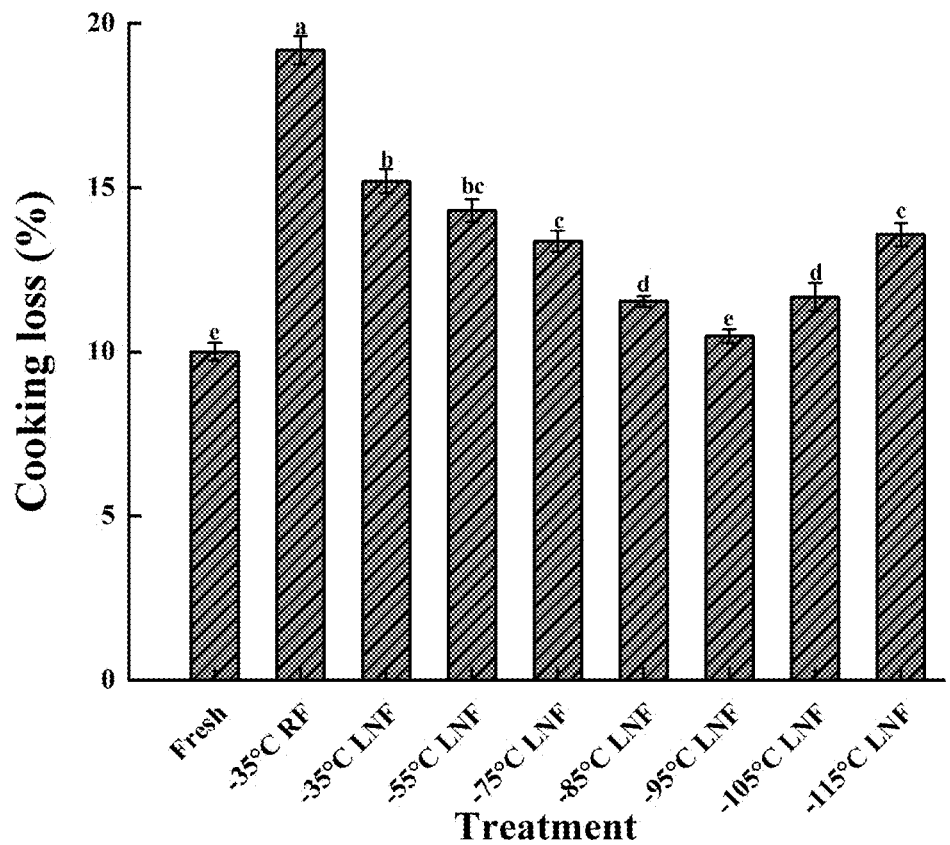
FIG. 3 is a result of the effect of the single-stage liquid nitrogen quick-freezing groups on cooking loss of golden pomfret muscle.

It can be seen from FIG. 3 that cooking loss of Fresh group is the lowest, being about 10%; cooking loss of air freezing group is the highest, being 19.18%; cooking loss of −95° C. LNF group (a single-stage liquid nitrogen quick-freezing group frozen at −95° C.) is 10.48%, which has no significant difference compared with that of the Fresh group; cooking loss of both −85° C. LNF group (a single-stage liquid nitrogen quick-freezing group frozen at −85° C.) and −105° C. LNF group (a single-stage liquid nitrogen quick-freezing group frozen at −105° C.) is significantly lower than that of remaining groups (single-stage liquid nitrogen quick-freezing groups frozen at −35° C., −55° C., −75° C., and −115° C.).

It shows that liquid nitrogen quick-freezing at a temperature of −105 to −85° C. has less cooking loss on golden pomfret muscles, which is close to a fresh state, especially at −95° C. there is the best effect. This is because a freezing speed of liquid nitrogen quick-freezing at −105 to −85° C. is fast, forming small and uniform ice crystals, which has little damage to the muscles, so the cooking loss is less; while a freezing speed of air freezing is slower, easy to generate large ice crystals, which can cause irreversible damage to muscle cells by squeezing the muscle cells, resulting in weak water holding capacity of the muscles, easier to lose water and nutrients during cooking process, therefore resulting in serious cooking loss; besides, the cooking loss of −115° C. LNF group (a single-stage liquid nitrogen quick-freezing group frozen at −115° C.) is higher that of −95° C. LNF group, which might be that too low liquid nitrogen temperature results in partial low-temperature fracture of fish flesh, thereby increasing the cooking loss.

(2) Determination of Hardness

A TPA measurement mode of the texture analyzer was used, and a test probe of P10 was used. The probe was tested on fish flesh of 3 cm*3 cm*1 cm (cut from another back muscle with a length*width*thickness of 8 cm*3 cm*1 cm in the two groups of Embodiment 1), with a pre-test rate of 1 mm/s, a test rate of 1 mm/s, a post-test rate of 5 mm/s, and a compression deformation of 50%. Measurement results are shown in FIG. 4.

Figure 4:
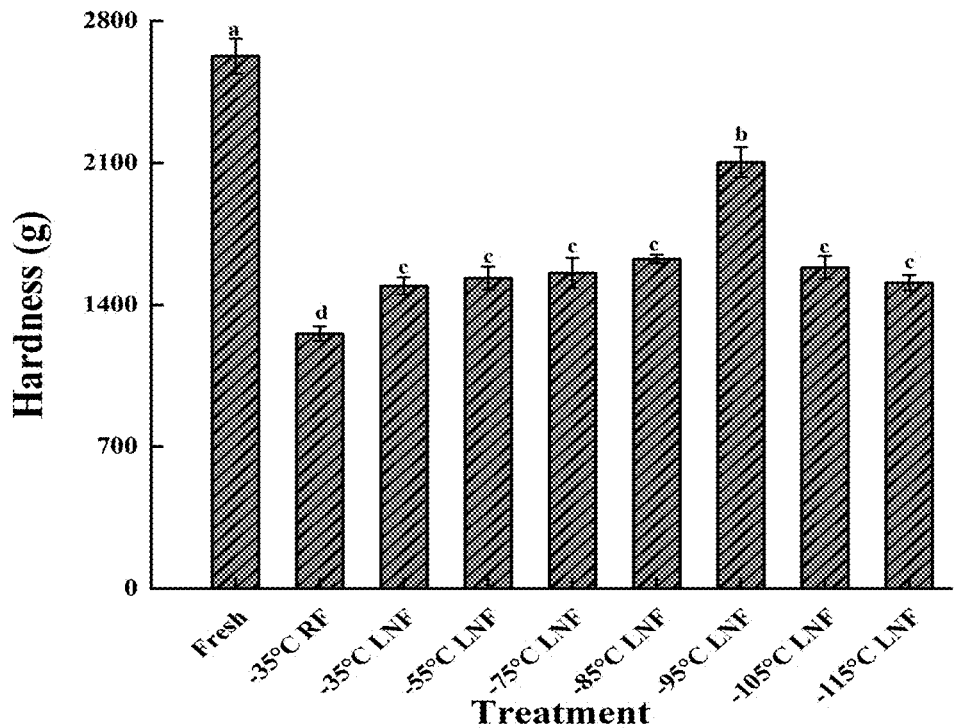
FIG. 4 is a result of the effect of the single-stage liquid nitrogen quick-freezing groups on hardness of golden pomfret muscle.

It can be seen from FIG. 4 that a hardness value of Fresh group is the largest, being 2627.63 g; a hardness value of air freezing group is the smallest, being 1256.79 g; a hardness value of −95° C. LNF group is 2104.33 g, which is significantly higher than that of remaining groups (single-stage liquid nitrogen quick-freezing groups frozen at −35° C., −55° C., −75° C., −85° C., −105° C. and −115° C.); hardness values of the remaining groups have no significant difference from each other, and all are significantly higher than that of air freezing group.

It shows that liquid nitrogen quick-freezing at a temperature of −115 to −35° C. is beneficial to maintain the hardness of golden pomfret muscles, especially at −95° C. there is the best effect. This is because a freezing speed of liquid nitrogen quick-freezing at −115 to −35° C. is fast, forming small and uniform ice crystals, which has little damage to the muscles, and thus inhibit a decrease of hardness value of muscles; while a freezing speed of air freezing is slower, easy to generate large ice crystals, which can cause irreversible damage to muscle cells by squeezing the muscle cells, resulting in weak water holding capacity of the muscles, therefore causing the hardness value in the muscles to decrease.

It can be seen from FIG. 3 and FIG. 4 that when the liquid nitrogen quick-freezing is performed at a temperature of −105 to −85° C., both cooking loss and hardness loss of the golden pomfret muscle are less. Therefore, in the present invention, −105 to −85° C. is selected as a first stage temperature of a two-stage liquid nitrogen quick-freezing treatment, and subsequent experiments were carried out at its optimum temperature of −95° C.

Figure 5:
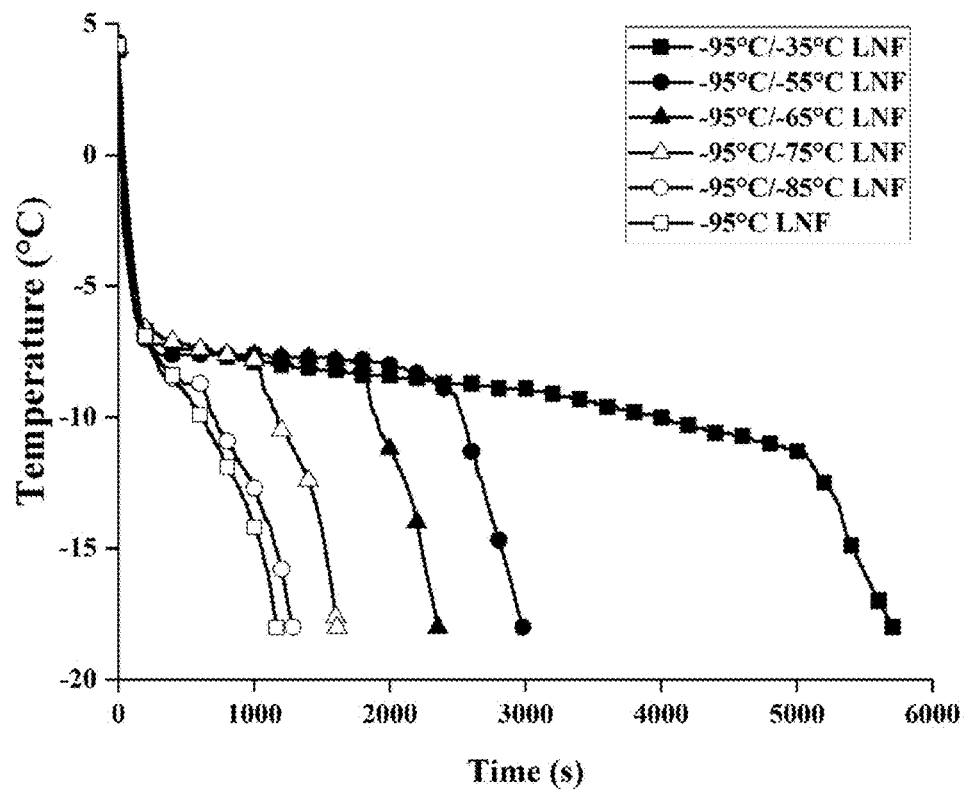
FIG. 5 is a freezing curve of two-stage liquid nitrogen quick-freezing groups.

Embodiment 3: Two-Stage Liquid Nitrogen Quick-freezing Treatment of Golden Pomfret S1. golden pomfret was put on a tray in a cavity of a liquid nitrogen quick-freezer with a cavity temperature of −95° C., a probe of a paperless recorder was quickly inserted into a geometric center of fish body, and a U-disk was inserted at the same time, time and temperature changes in real time were recorded, and data changes were recorded every two seconds, a gate of the quick-freezer was closed, a start button was activated, liquid nitrogen began to spray the fish; after a core temperature of fish body reached −5° C., the liquid nitrogen quick-freezer was turned off immediately, and liquid nitrogen was stopped using;

S2. when the cavity temperature of the liquid nitrogen quick-freezer was raised from −95° C. to −35° C., −55° C., −65° C., −75° C., −85° C. and −95° C., the liquid nitrogen quick-freezer was started again to continue spraying liquid nitrogen until the core temperature of the fish body reached −18° C., the liquid nitrogen quick-freezer was turned off, freezing was finished, the U-disk was pulled out, and data were imported into origin software to draw a freezing curve of two-stage liquid nitrogen quick-freezing, as shown in FIG. 5;

S3. the frozen golden pomfret was quickly transferred to −18° C. for 24 h storage, then put in a refrigerator at 4° C. for thawing, until the core temperature of the fish body reached 4° C., muscles on both sides of its back (length*width*thickness as 8 cm*3 cm*1 cm) were taken for subsequent determination of indicators.

Combining FIG. 1 and FIG. 5, it can be seen that time of the two-stage liquid nitrogen quick-freezing treatment groups is significantly shorter than that of the air freezing treatment group, indicating that a freezing speed of the two-stage liquid nitrogen quick-freezing is significantly faster than that of air freezing.

Embodiment 4: Determination of Liquid Nitrogen Consumption of Two-Stage Liquid Nitrogen Quick-freezing Treatment Groups The liquid nitrogen consumption of the two-stage liquid nitrogen quick-freezing treatment groups was calculated by a weighing method. That is, a scale was placed under a liquid nitrogen tank of a liquid nitrogen quick-freezer, before liquid nitrogen began to spray, initial mass of liquid nitrogen $m_1$ was recorded; until a core temperature of fish body reached −18° C., residual mass of liquid nitrogen $m_2$ was recorded; and initial mass of golden pomfret was marked as $m_3$, and according to a formula [liquid nitrogen consumption $[kg(LN_2)/kg(fish)]=(m_1-m_2)/m_3]$ the liquid nitrogen consumption was calculated, obtaining FIG. 6.

Figure 6:
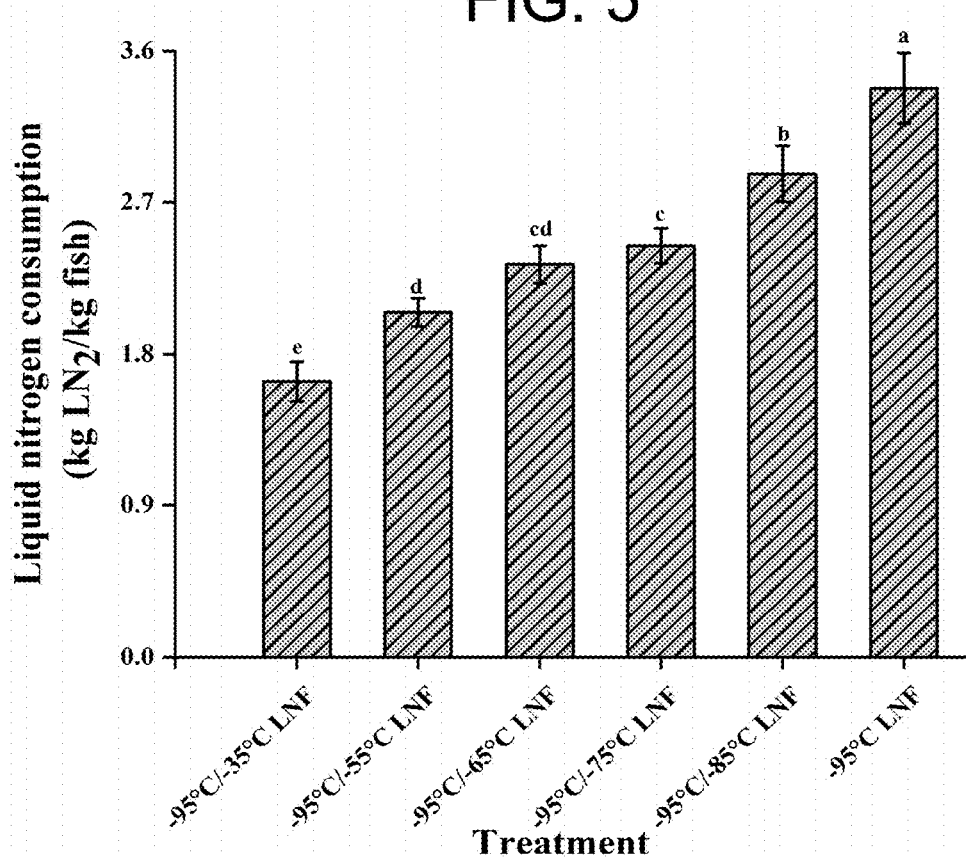
FIG. 6 is a result of liquid nitrogen consumptions of the two-stage liquid nitrogen quick-freezing groups.

It can be seen from FIG. 6 that:

(1) A liquid nitrogen consumption of −95° C. LNF group is the highest, being 3.38 kg(LN2)/kg(fish);

(2) A liquid nitrogen consumption of −95° C./−35° C. LNF group is the lowest, only being 1.66kg(LN2)/kg(fish), which saves 1.72kg(LN2)/kg(fish) compared with −95° C. LNF group, saving 50.89%;

(3) A liquid nitrogen consumption of −95° C./−55° C. LNF group is 2.05kg(LN2)/kg(fish), which saves 1.33kg (LN2)/kg(fish) compared with −95° C. LNF group, saving 39.35%;

(4) A liquid nitrogen consumption of −95° C./−65° C. LNF group is 2.33kg(LN2)/kg(fish), which saves 1.05kg (LN2)/kg(fish) compared with −95° C. LNF group, saving 31.07%;

(5) A liquid nitrogen consumption of −95° C./−75° C. LNF group is 2.44kg(LN2)/kg(fish), which saves 0.94kg (LN2)/kg(fish) compared with −95° C. LNF group, saving 27.81%; and (6) A liquid nitrogen consumption of −95° C./−85° C. LNF group is 2.87kg(LN2)/kg(fish), which saves 0.51kg (LN2)/kg(fish) compared with −95° C. LNF group, saving 15.10%.

To sum up, it can be seen that the two-stage liquid nitrogen quick-freezing treatment of golden pomfret is more energy-saving, and the higher the second stage temperature of the liquid nitrogen quick-freezer is, the less the liquid nitrogen consumption is, this is because a remaining liquid nitrogen cooling capacity in the first stage is fully utilized to varying degrees in the second stage freezing, thereby reducing the liquid nitrogen consumption and achieving energy saving.

Embodiment 5: Determination of Cooking Loss and Hardness of Two-Stage Liquid Nitrogen Quick-freezing Treatment Groups (1) Determination of Cooking Loss A thawed sample in the two groups of Embodiment 3 (one of the two back muscles with a length*width*thickness of 8 cm*3 cm*1cm) was weighed ($W_1$) and heated in a water bath at 85° C. until a core temperature of the sample reached 75° C., filter paper was used to absorb moisture on a surface of the sample, mass of the sample was accurately weighed, recorded as $W_2$, and cooking loss was calculated according to a formula [cooking loss (%)=$(W_1-W_2)/W_1*100\%$], the cooking loss data of air freezing group in Embodiment 2 were continued to use, obtaining FIG. 7.

Figure 7:
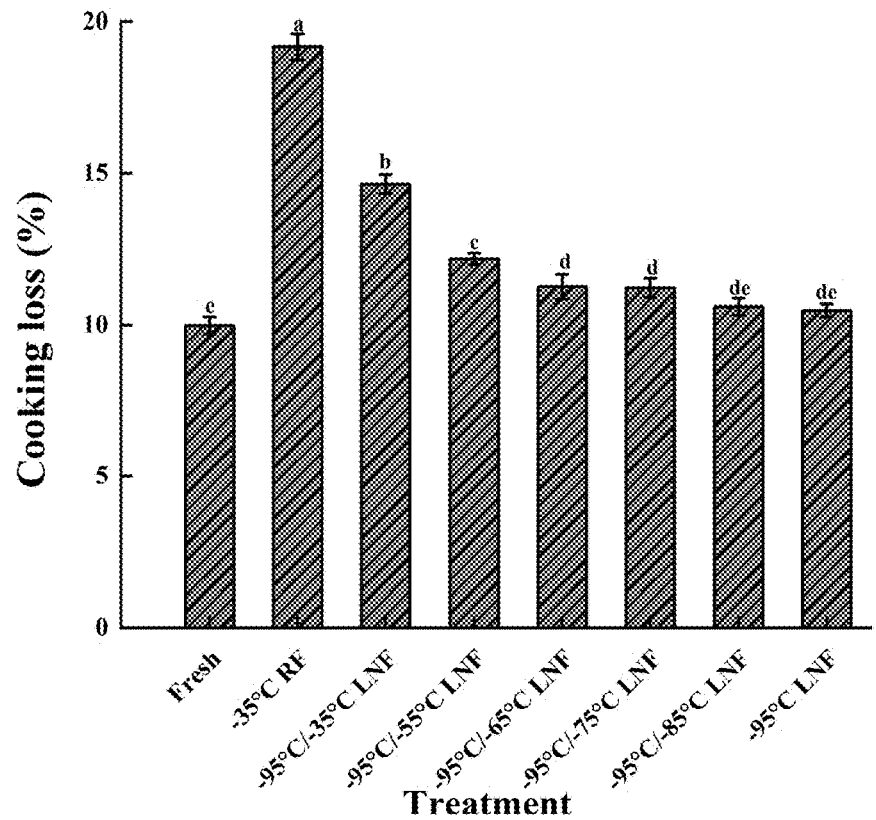
FIG. 7 is a result of the effect of the two-stage liquid nitrogen quick-freezing groups on cooking loss of golden pomfret muscle.

It can be seen from FIG. 7 that cooking loss of Fresh group is the lowest, being 9.99%; cooking loss of air freezing group is the highest, being 19.18%; and cooking loss of −95° C./−65° C. LNF group, −95° C./−75° C. LNF group, −95° C./−85° C. LNF and −95° C. LNF group is 11.24%, 11.21%, 10.60% and 10.48%, respectively, significantly lower than that of remaining groups (−95° C./−35° C. LNF group, −95° C./−55° C. LNF group), and there are no significant differences among the four groups. It shows that setting a second stage temperature of the two-stage liquid nitrogen quick-freezing treatment as −95 to −65° C. can effectively reduce cooking loss of golden pomfret muscles.

(2) Determination of Hardness

A TPA measurement mode of the texture analyzer was used, and a test probe of P10 was used. The probe was tested on fish flesh of 3 cm*3 cm*1 cm (cut from another back muscle with a length*width*thickness of 8 cm*3 cm*1 cm in Embodiment 3), with a pre-test rate of 1 mm/s, a test rate of 1 mm/s, a post-test rate of 5 mm/s, and a compression deformation of 50%. And the hardness data of air freezing group in Embodiment 2 were continued to use. Measurement results are shown in FIG. 8.

Figure 8:
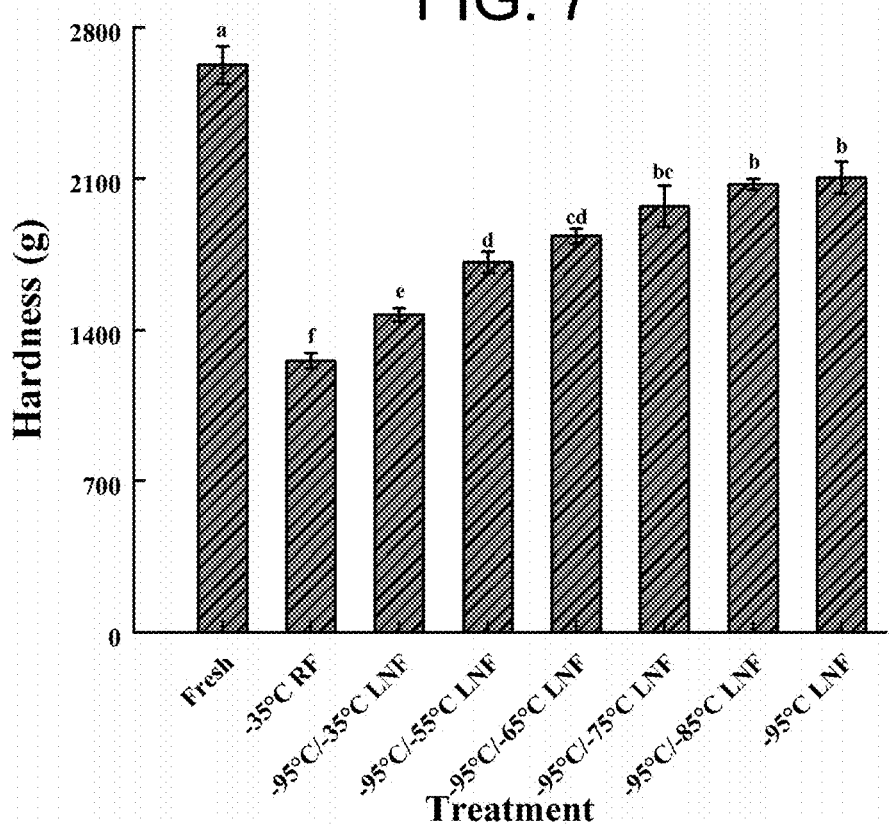
FIG. 8 is a result of the effect of the two-stage liquid nitrogen quick-freezing groups on hardness of golden pomfret muscle.

It can be seen from FIG. 8 that a hardness value of Fresh group is the largest; a hardness value of air freezing group is the smallest, being 1256.79 g; a hardness value of −95° C. LNF group is the largest, being 2104.33 g, second only to that of Fresh group, and which has no significant difference compared with −95° C./−75° C. LNF group (hardness value 1917.95 g) and −95° C./−85° C. LNF group (hardness value 2072.92 g); there are no significant differences between −95° C./−65° C. LNF group (hardness value 1832.11 g) and −95° C./−75° C. LNF. It shows that setting a second stage temperature of the two-stage liquid nitrogen quick-freezing treatment as −95 to −65° C. can effectively maintain hardness of golden pomfret muscles.

Combining FIG. 6 to FIG. 8, from two aspects of energy saving and quality of golden pomfret, −95 to −65° C. is a preferred selection for the second stage temperature of the two-stage liquid nitrogen quick-freezing treatment, and −75 to −65° C. is the best selection.

To sum up, the present invention starts from two aspects of energy saving and quality of golden pomfret, conducts targeted research on quick-freezing method for golden pomfret, and creatively transforms the quick-freezing method of single-stage liquid nitrogen quick-freezing into two-stage liquid nitrogen quick-freezing. Through a specific control of parameters such as freezing temperature and full use of liquid nitrogen, not only a liquid nitrogen consumption is reduced and energy saving is achieved, but also it is conducive to a rapid production of extremely numerous uniform small ice crystals in body of golden pomfret, with less damage to fish tissue, thereby reducing hardness loss and cooking loss during the freezing process of golden pomfret, effectively ensuring a quality of golden pomfret and prolonging a shelf life of golden pomfret.

The above-mentioned embodiments are preferred implementations of the present invention, but the implementations of the present invention are not limited by the above-mentioned embodiments, and any other changes, modifications, substitutions, combinations and simplifications made without deviating the spirits and principles of the present invention shall be equivalent replacements, which are all included in the protection scope of the present invention.

What is claimed is:

1. A quick-freezing method for golden pomfret, wherein the quick-freezing method comprises the following steps:
    S1. putting golden pomfret into a cavity of a spray liquid nitrogen quick-freezer with a cavity temperature of A, and when a core temperature of fish body reaches −6 to −4° C. in the cavity temperature of A, turning off the spray liquid nitrogen quick-freezer to stop spraying liquid nitrogen;
    S2. when the cavity temperature of the spray liquid nitrogen quick-freezer rises to B, starting the spray liquid nitrogen quick-freezer, and when the core temperature of the fish body reaches −19 to −17° C., turning off the spray liquid nitrogen quick-freezer to stop spraying liquid nitrogen; and
    S3. taking out the golden pomfret from the cavity and storing at −19 to −17° C.;
    wherein, the A is −105 to −85° C., the B is −95 to −65° C., and the A is less than the B,
    wherein the cavity temperature is a temperature of gasified liquid nitrogen in the cavity of the spray liquid nitrogen quick-freezer, and the core temperature of the fish body is a temperature at a location within the fish body and beneath a surface of the fish,
    wherein before taking out the golden pomfret from the cavity, the cavity temperature of the liquid nitrogen quick-freezer is less than −65° C.

2. The quick-freezing method according to claim 1, wherein the A is −95° C.

3. The quick-freezing method according to claim 2, wherein the B is −75 to −65° C.

4. The quick-freezing method according to claim 1, wherein the core temperature of the fish body in step S1 is −5° C.

5. The quick-freezing method according to claim 1, wherein the core temperature of the fish body in step S2 is −18° C.

6. The quick-freezing method according to claim 1, wherein a storage temperature in step S3 is −18° C.

7. The quick-freezing method according to claim 1, wherein the spray liquid nitrogen quick-freezer comprises a cabinet spray liquid nitrogen quick-freezer or a tunnel liquid nitrogen quick-freezer.

8. The quick-freezing method according to claim 1, wherein the core temperature of the fish body is a temperature at a geometric center of the fish body, and the geometric center of the fish body is a location longitudinally along a center of a fish back and at half thickness of back muscle of the golden pomfret.

* * * * *